Aug. 14, 1956

L. RICEFIELD 2,758,365

METHOD OF MAKING SELF-ALIGNING BEARINGS

Filed July 30, 1953

INVENTOR.
Louis Ricefield,
BY Smith, Olsen, Baird & Gulbrandsen
Atty's.

Aug. 14, 1956 — L. RICEFIELD — 2,758,365
METHOD OF MAKING SELF-ALIGNING BEARINGS
Filed July 30, 1953 — 2 Sheets-Sheet 2
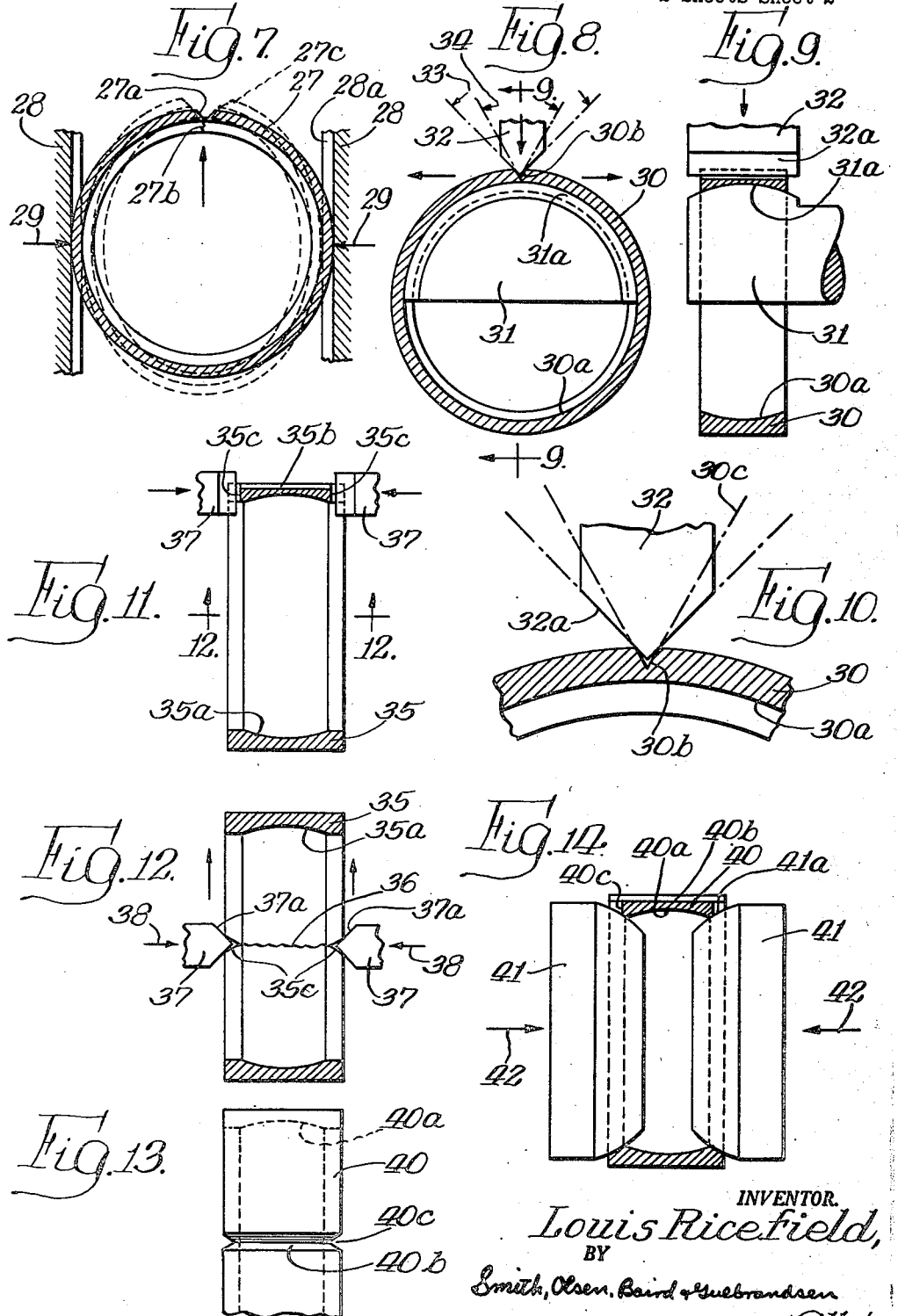
INVENTOR.
Louis Ricefield,
BY Smith, Olsen, Baird & Guebrandsen
Attys.

United States Patent Office 2,758,365
Patented Aug. 14, 1956

2,758,365
METHOD OF MAKING SELF-ALIGNING BEARINGS

Louis Ricefield, Oak Park, Ill.

Application July 30, 1953, Serial No. 371,316

4 Claims. (Cl. 29—149.5)

This invention relates to improvements in a method of making self-aligning bearings and its purpose is to provide an improved bearing which may be used with particular advantage in rod end bearings employed in airplane construction. This application is a continuation-in-part of my copending application Serial No. 226,070, filed May 12, 1951 now abandoned.

It has heretofore been the practice to provide the guy rods or reinforcing rods of airplanes with self-aligning bearings located at the ends of the rods in order to permit some relative movement under the influence of the strains which are set up in the parts of the plane during its travel. These prior rod end bearings have usually comprised a spherical ball attached to the rod and surrounded by an annular bearing ring or raceway. The assembly of such rod end bearings has presented a problem and it has been necessary either to form the outer ring in two parts, capable of being secured together to embrace the ball, or to make the outer ring of sufficient bore to receive the ball and then to fill the gap between the ball and the ring by annular inserts of malleable material capable of being formed by pressure or swaging, which are driven into the space between the ball and the ring and are thereby deformed to provide concave surfaces which form a raceway for the ball. These prior methods of construction have involved some difficulty and considerable expense in assembling the parts and the bearings have not been uniformly satisfactory in use.

The principal object of the present invention is to improve upon these prior methods by providing a self-aligning bearing comprising a ball and a surrounding one-piece ring which contact each other directly and are capable of being readily assembled. A further object is to provide an improved method of making a self-aligning bearing comprising a spherical ball and a surrounding resilient bearing ring, formed preferably of spring steel or the like, which is split or otherwise provided with a gap at one point, so that the ring may be expanded to permit the insertion of the ball and will then contract by its own resilience to provide a raceway engaging the surface of the ball. Another object of the invention is to provide a new method of forming and assembling a self-aligning bearing according to which a spherical ball and a resilient bearing ring are brought into operative contacting relation by splitting the ring at one point, expanding the ring, inserting the ball in the ring while the ring is expanded, and then permit the ring to contract on the ball and provide a bearing surface therefor. Another object of the invention is to provide novel methods of splitting the ring of the improved bearing preliminary to expanding the ring to receive the ball. Other objects relate to various features of construction and to details of the method which will appear more fully hereinafter.

The nature of the invention will be understood from the following specification taken with the accompanying drawings in which the improved bearing and several examples of the improved method of forming the bearing are illustrated. In the drawings, Figure 1 shows a sectional view through a portion of an airplane illustrating one embodiment of the present invention as used in the construction of a rod end bearing, the inner parts of the bearing construction being shown in elevation;

Fig. 7 shows a sectional view similar to that of Fig. 3 illustrating a modified method of splitting the ring to permit the insertion of the ball;

Fig. 8 shows a radial section through the outer ring of the present invention illustrating still another method of splitting the ring to permit the insertion of the ball;

Fig. 9 shows a sectional view taken on the line 9—9 of Fig. 8;

Fig. 10 shows an enlarged sectional view corresponding to the upper part of the view of Fig. 8 illustrating the configuration of the parts by which the splitting of the ring is effected;

Fig. 11 shows an axial section through another form of ring which has been modified to permit the use of still another method of splitting the ring to permit the insertion of the ball;

Fig. 12 shows a sectional view taken on the line 12—12 of Fig. 11;

Fig. 13 shows a partial plan view of a modified form of outer ring which may be employed in forming the bearing to which the present invention relates; and Fig. 14 is a sectional view through the ring of Fig. 13 illustrating a further method of effecting the splitting of the ring to allow the ball to be inserted.

Figure 1:
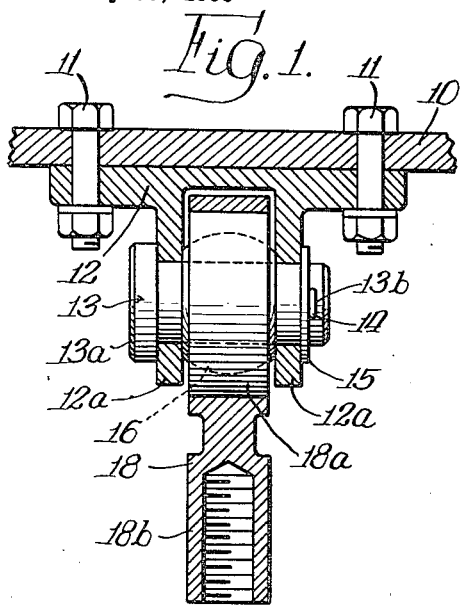
Figure 2:
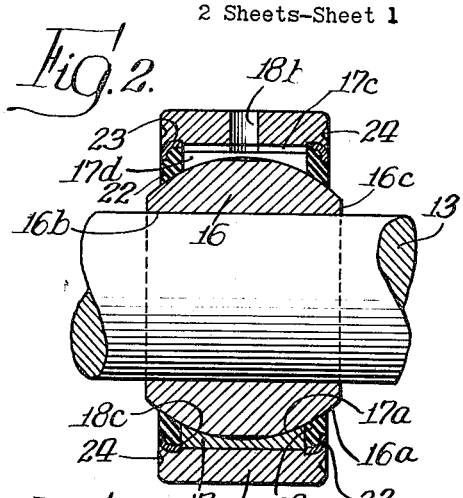
Fig. 2 shows an enlarged axial section through the self-aligning bearing embodied in the construction illustrated in Fig. 1.

As previously indicated the present invention is directed to a method of forming a bearing which is particularly adapted for use in airplane construction, although capable of other uses, and which has the advantage of permitting some relative angular movement between the ends of tie rods or guy rods with respect to other parts of the airplane construction to which these rods are connected. One mode of making use of such a bearing is illustrated in Fig. 1 where a frame member 10 of the airplane has secured thereto by bolts 11 a bracket 12 comprising parallel downwardly extending flanges 12a which are provided with aligning apertures having inserted therein a pin 13 having a head 13a at one end and a projecting part at the other in which there is provided a transverse aperture 13b in which there is mounted a cotter pin 14 adapted to engage the outer face of a washer 15 which is mounted on the end of the pin against the adjacent flange 12a.

Mounted on the pin 13 between the flanges 12a there is a ball 16 formed as a segment of a spherical ball and provided with an annular segment of a spherical surface 16a. This ball is provided with a central aperture 16b which is engaged by the pin 13 and it is adapted to have angular and rotary movement in an outer bearing ring 17 which is provided on its inner side with an annular segment of a spherical surface 17a arranged to coact with the annular surface 16a of the ball. This outer ring is secured within a sleeve 18a forming a part of a bracket 18 which has an internally threaded socket portion 18b in which a tie rod of the airplane is adapted to be threaded. With this arrangement, it will be seen that the tie rod and its connected bracket 18 together with the relatively fixed outer ring 17 of the bearing are adapted to have some degree of rotation and angular movement about the surface 16a of the ball 16, sufficient to accommodate the relative angular movement of the tie rod and the frame member 10 during the normal operation of the airplane.

In order to make it possible to insert the ball 16 within the outer ring 17 and to allow for the subsequent contact of the bearing surfaces 16a and 17a, while retaining an integral one-piece construction of the ring 17, this ring is split at one point around its circumference in order to permit the ring to be expanded to a sufficient extent to allow the entry of the ball. To facilitate this splitting of the ring at a predetermined point, the outer peripheral surface of the ring is preferably provided with a transversely extending groove 17c which is designed to weaken the ring at this point. If the ring is then rested in a cavity 19a formed in a support 19, with the groove 17c located at the top of the ring, pressure may be applied on the ring within the groove by a sharp instrument 20 which will bend the ring from the position shown by dotted lines in Fig. 4 to the position shown in full lines with a resulting splitting of the ring, where it is weakened by the groove 17a, to form a gap as shown at 21. When the pressure of the instrument 20 is removed, the ring 17, being formed of resilient metallic material, will return by its own resiliency to its normal circular form.

Figure 5:
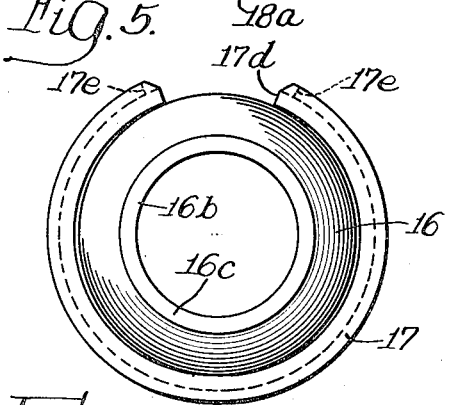
Fig. 5 shows a side elevation of the expanded ring and of the ball while the ball is in the process of being inserted into the ring.
Figure 4:
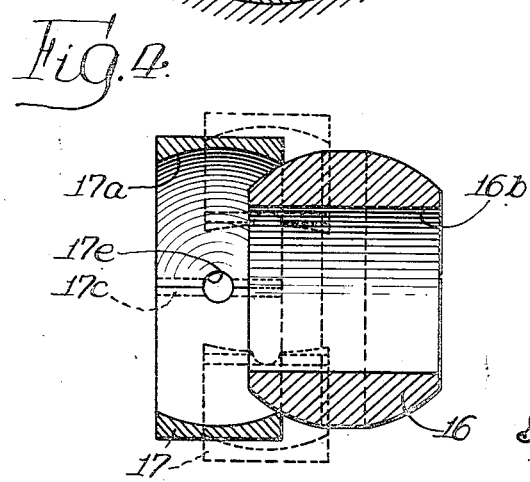
Fig. 4 shows a sectional view through the outer ring and the ball with the ring in its normal condition shown by full lines and with the illustration by dotted lines of the expanded condition of the ring to permit the insertion of the ball within the ring.
Figure 6:
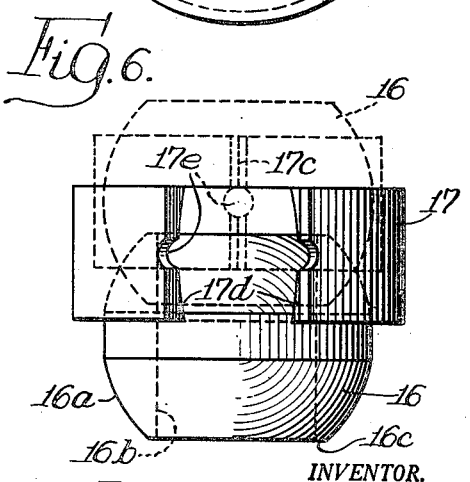
Fig. 6 shows a top plan view of the expanded ring with the ball partially entered into the ring and illustrating, by dotted lines, the condition of the ring after it has been subsequently contracted following the insertion of the ball.

The ring 17 is then in readiness for the insertion of the ball 16 which is effected by expanding the ring in the manner illustrated in Figs. 4, 5 and 6 to separate the end surfaces 17d of the ring and thereby enlarge the ring to such an extent that the ball 16 may be readily inserted, as shown in Fig. 5. When the ball has been inserted to a point where its radial axis is coincident with the radial axis of the ring 17, the ring is allowed to contract by its own resiliency, whereupon the surface 17a of the ring will move into engagement with the outer surface 16a of the ball and the end surfaces 17d of the ring will move substantially into engagement with each other, thus completing the assembled condition of the ring and the ball.

After this assembly has been effected, the ring 17 may be secured within the sleeve 18a of the bracket 18, by pressing it into a tight fitting engagement with the inner wall of the sleeve 18a or by other suitable means. This insures that the ring 17 will retain its original perfect circular form and will permanently fit over the ball with such working clearance as was originally provided for prior to splitting and expanding the ring. After the assembled bearing unit has been placed in the sleeve 18a these parts are inserted between the flanges 12a and the pin 13 may then be put in place through the central bearing aperture 16b of the ball. This is followed by placing the washer 15 on the end of the pin and inserting the cotter pin 14. The axial length of the ball 16 between its end faces 16c is preferably only slightly less than the distance between the adjacent faces of the flanges 12a, but the ring 17 and the sleeve 18a preferably have a width substantially less than the distance between the flanges 12a in order to permit the required angular movement of the bracket 18 and the ring 17 about the ball when the bearing is in use.

In order to facilitate the lubrication of the contacting bearing surfaces 16a and 17a, the sleeve 18a is provided with an aperture 18b, and the ring 17 is provided with an aperture 17e, through which a lubricant may be inserted to the point where it has access to the area between these bearing surfaces. The aperture 17e is preferably located in registry with the groove 17c and in making the assembly, the ring 17 is preferably so located in the sleeve 18a that the gap 21 between the end faces of the split ring and the aperture 17e will be located at the point where the aperture 18b is located, thus permitting a ready access of the lubricant to the bearing surfaces. To retain the lubricant on the bearing surfaces, two flexible nonmetallic lubricant retaining rings 22 are provided in contact with the lateral edges of the bearing ring 17. These retaining rings 22, which may be formed of felt, synthetic rubber, or the like, are secured at their outer edges in metal rings 23 of angular cross section which fit within the sleeve 18a and fit against shoulders 18c which are formed on the inner surface of the sleeve 18a at the margins of the ring 17. The metal of the sleeve 18a is peened outwardly against the metal rings 23 as shown at 24 to hold the rings 23 and the nonmetallic sealing rings 22 securely in place.

Figure 3:
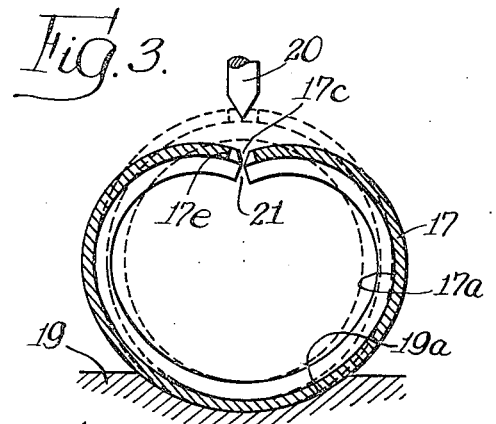
Fig. 3 shows one method of splitting the outer ring of the bearing construction, according to the method of the present invention, to permit its subsequent expansion for receiving the inner ball.

Instead of employing the particular method of splitting the outer ring of the bearing which is illustrated in Fig. 3, other methods of splitting the ring to permit the insertion of the ball may be followed and several such modified methods are illustrated in Figs. 7 to 14, inclusive. In Fig. 7 there is illustrated an outer ring 27 corresponding to the ring 17 previously described and adapted to receive within it a ball corresponding to the ball 16. This ring 27 is provided on its outer side, at one point only around its periphery, with a transverse groove 27a which extends from one edge of the ring to the other, as in the form of construction shown in Figs. 3 and 6. By this method, the ring is split at 27b, inwardly of the groove 27a, by applying pressure laterally to the ring in a plane at right angles to the plane in which the groove 27a is located. This pressure may be applied by two pressure members 28 which are provided with grooves 28a adapted to receive the outer portions of the ring 27 and these pressure members are moved toward each other as indicated by the arrows 29 with the result that the ring 27 is compressed in one direction and is caused to expand in a right angular direction so that the ring is split where it has been weakened by the groove 27a and the edge portions of the metal at opposite sides of the split then move upwardly and away from each other as shown at 27c. When the ring has been split in this manner, the ball 16 may be inserted in the manner previously described and the ring 27 will then contract by its own resilience so that the surfaces of the metal along the line of the break 27b will contact with each other and the circular form of the ring will thereby be restored.

In Figs. 8, 9 and 10 of the drawings there is illustrated still another method of splitting the outer ring of a bearing constructed according to the present invention. In this modified method the ring 30 which is adapted to receive within it the ball 16 and which is provided on its inner side with a concave surface 30a to conform to the external curvature of the ball, is provided at one point around its periphery with a V-shaped transverse groove 30b extending inwardly from its outer surface throughout its width. This ring is adapted to be placed upon a supporting member 31 having an outer bearing surface 31a which is curved laterally and circumferentially to correspond to the curvature of the ring 30. The ring 30 is placed upon the member 31 with the groove 30b directed upwardly and the ring is then split by driving into the groove 30b a wedge member 32 having lower converging faces 32a which diverge at an angle 33 which is slightly greater than the angle of divergence 34 of the converging side faces 30c of the groove 30b. Thus, when the wedge member 32 is driven downwardly by the blows of a hammer or by hydraulic pressure or the like, the lower faces 32a of this member act as a wedge to separate the parts of the ring 30 which are on opposite sides of the groove 30b, whereby it is split radially throughout its width in the region beneath the groove. The ring 30 may then be expanded to permit the insertion of the ball 16 as previously described.

In Figs. 11 and 12 of the drawings there is illustrated still another method of splitting the ring of a bearing constructed according to the method of the present invention. This method involves the use of an outer ring 35 having an inner bearing surface 35a which is adapted to coact with the ball 16 and having at one point around its periphery a transverse groove 35b extending inwardly from the outer surface of the ring, as shown in Fig. 11. In addition to the groove 35b, the ring 35 is provided with edge grooves 35c which extend radially of the ring 35 and communicate with the outer ends of the groove 35b. The ring 35 is split along the line 36 by wedge members 37 each having converging end faces 37a which diverge at an angle greater than the angle of divergence of the walls of the grooves 35c. When the pressure members 37 are driven toward each other in the direction of the arrows 38, the end faces of the pressure members act as wedges to split the ring along the line 36 by forces acting parallel to the axis of the ring. When this splitting operation has been performed, the ring may be expanded to receive the ball 16 and will then contract until the surfaces of the metal at the place where the split occurs will contact with each other as the ring resumes a circular form conforming to the circular contour of the ball 16. Still another method of effecting the splitting of the outer ring of the bearing is illustrated in Figs. 13 and 14 where the ring 40 has an inner annular spherical surface 40a adapted to conform to the external curvature of the ball 16. This ring is provided at one point around its periphery with a transverse groove 40b which communicates at its ends with radially extending grooves 40c, whereby the ring is substantially weakened in the region of these grooves. The ring 40 is generally similar to the ring 35 but the method of splitting the ring 40 is preferably carried out in the manner illustrated in Fig. 14 where two circular pressure members 41 are mounted on opposite sides of the ring 40 and then moved toward each other as indicated by the arrows 42. The pressure members 41 are provided at their inner ends with annular surfaces 41a which are curved in radial cross section and which are adapted to extend into the ring 40 in contact with its inner annular surfaces at the outer margins of the bearing surface 40a. Thus, when these members 41 are moved in the directions of the arrows 42, they exert a radial pressure acting outwardly on all parts of the ring 40 with the result that it is split from edge to edge in the region where it has been weakened by the provision of the grooves 40b and 40c. After this splitting has been performed, the ring may be expanded and caused to embrace the ball 16 in the manner previously described.

In all of the methods of carrying out the present invention, the weakening of the outer ring, by a transverse groove or the like, is confined to the region outside of its inner annular bearing surface.

Although one embodiment of the bearing to which the present invention relates has been illustrated with modifications thereof together with the disclosure of several methods of splitting the ring of the bearing member in the process of effecting its assembly, it will be understood that both the construction and the method may be modified in various ways without departing from the scope of the appended claims.

I claim:

1. The method of forming and assembling a self-aligning bearing which comprises the steps of forming a spherical ball, providing a resilient metallic ring having an inner annular concave surface adapted to fit the surface of said ball, providing a transverse groove in said ring at one point about its periphery, applying radial pressure to said ring at said groove to cause said ring to split transversely at the location of said groove, expanding said split ring, inserting said ball in said ring, and then allowing said ring to contract into engagement with said ball with its broken surfaces in contact with each other.

2. The method of forming and assembling a self-aligning bearing which comprises the steps of forming a spherical ball, providing a resilient metallic ring having an inner annular concave surface adapted to fit the surface of said ball, modifying said ring to weaken it at one point only around its periphery, applying pressure to said ring to cause said ring to split transversely at the place where it has been weakened, expanding said split ring, inserting said ball in said ring, and then allowing said ring to contract into engagement with said ball with its broken surfaces in contact with each other.

3. The method of forming and assembling a self-aligning bearing which comprises the steps of forming a spherical ball, providing a resilient metallic ring having an inner annular concave surface adapted to fit the surface of said ball, providing a groove in said ring at one point around its periphery, applying pressure to said ring to cause said ring to split transversely at the location of said groove, expanding said split ring, inserting said ball in said ring, and then allowing said ring to contract into engagement with said ball with its broken surfaces in contact with each other.

4. The method of forming and assembling a self-aligning bearing which comprises the steps of forming a spherical ball, providing a resilient metallic ring having an inner annular concave surface adapted to fit the surface of said ball, modifying said ring to weaken it at one point only around its periphery outside of said inner annular concave surface, applying pressure to said ring to cause said ring to split transversely at the place where it has been weakened, expanding said split ring, inserting said ball in said ring, and then allowing said ring to contract into engagement with said ball with its broken surfaces in contact with each other.

References Cited in the file of this patent

UNITED STATES PATENTS

| | | |
|---|---|---|
| 2,371,399 | Mantle | Mar. 13, 1945 |
| 2,624,105 | Virtue | Jan. 6, 1953 |
| 2,624,645 | Virtue | Jan. 6, 1953 |
| 2,625,449 | Sutowski | Jan. 13, 1953 |
| 2,626,841 | Potter | Jan. 27, 1953 |